(12) United States Patent
Shibata

(10) Patent No.: US 10,962,150 B2
(45) Date of Patent: *Mar. 30, 2021

(54) RUBBER HOSE

(71) Applicant: Hitachi Metals, Ltd., Tokyo (JP)

(72) Inventor: Tomonori Shibata, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,788

(22) Filed: Sep. 11, 2019

(65) Prior Publication Data

US 2020/0003341 A1  Jan. 2, 2020

Related U.S. Application Data

(63) Continuation of application No. 15/880,107, filed on Jan. 25, 2018, now Pat. No. 10,451,201.

(30) Foreign Application Priority Data

Feb. 1, 2017  (JP) .............................. JP2017-016414

(51) Int. Cl.
*F16L 11/04* (2006.01)
*F16L 11/08* (2006.01)
(Continued)

(52) U.S. Cl.
CPC .............. *F16L 11/086* (2013.01); *B32B 1/00* (2013.01); *F16L 11/02* (2013.01); *F16L 11/04* (2013.01)

(58) Field of Classification Search
CPC .......... F16L 11/087; F16L 11/08; F16L 11/00; B29D 23/00; B29D 70/16; B32B 1/08; B32B 25/10
(Continued)

(56) References Cited

U.S. PATENT DOCUMENTS 4,971,127 A ‡ 11/1990 Oshima ................. B60C 9/0042
152/527
6,450,206 B2 ‡ 9/2002 Ishikawa ................. F16L 11/08
138/124

(Continued)

FOREIGN PATENT DOCUMENTS

JP    H 11-256489 A    9/1999
JP    2000108885 A *   4/2000
(Continued)

OTHER PUBLICATIONS

Kuraray Co., Ltd. Functional Material Division Vinylon Filament WEB Site Product introduction—Vinylon filament—, [online], [Search on Dec. 25, 2018], Internet <URL, http://kuraray-vf.jp/product/index.html>, and English Translation thereof.
(Continued)

*Primary Examiner* — Patrick F Brinson

(74) *Attorney, Agent, or Firm* — McGinn I.P. Law Group, PLLC.

(57) ABSTRACT

A rubber hose with a fixing bracket includes an inner rubber layer defining a hollow portion, first and second braided layers formed on the inner rubber layer, and an outer rubber layer formed on an outer periphery of the second braided layer.

10 Claims, 3 Drawing Sheets

(51) Int. Cl.
   *F16L 11/02* (2006.01)
   *B32B 1/00* (2006.01)
(58) Field of Classification Search
   USPC .............................. 138/123–126, 106, 107
   See application file for complete search history.

(56) References Cited

U.S. PATENT DOCUMENTS

| | | | |
|---|---|---|---|
| 6,830,075 B1* | 12/2004 | McKinney | F16L 3/1236 |
| | | | 138/106 |
| 10,451,201 B2* | 10/2019 | Shibata | F16L 11/04 |
| 2006/0170206 A1* | 8/2006 | Mitsui | B60T 17/046 |
| | | | 280/797 |
| 2008/0223806 A1* | 9/2008 | Foxx | B61G 7/00 |
| | | | 213/75 R |
| 2013/0000767 A1‡ | 1/2013 | Nonaka | B29C 70/026 |
| | | | 138/106 |
| 2014/0197285 A1* | 7/2014 | Lucas | B60T 17/046 |
| | | | 248/75 |
| 2014/0326355 A1 | 11/2014 | Nonaka et al. | |
| 2016/0131283 A1 | 5/2016 | Nonaka et al. | |

FOREIGN PATENT DOCUMENTS

| | | | |
|---|---|---|---|
| JP | 2000-290880 A | | 10/2000 |
| JP | 2004-238757 A | | 8/2004 |
| JP | 2004238757 A | ‡ | 8/2004 |
| JP | 2012-112439 A | | 6/2012 |
| JP | 2014-219026 A | | 11/2014 |
| JP | 2015-061762 A | | 4/2015 |
| JP | 2015061762 A | ‡ | 4/2015 |
| JP | 2017-145855 A | | 8/2017 |
| JP | 2017145855 A | ‡ | 8/2017 |

OTHER PUBLICATIONS

General Chemical Fiber Technology Improvement Research Association Database of fabrics Chapter 1 1. 1. 3, [online], [Search on Dec. 25, 2018], Internet <URL,http://www.kaizenken.jp/db/chap1/data1_1/3_property1_1_3_1.pdf>.
Japanese Office Action, dated Feb. 8, 2019, in Japanese Application No. 2017-016414 and English Translation thereof.

\* cited by examiner
‡ imported from a related application

RUBBER HOSE

The present application is a Continuation Application of U.S. patent application Ser. No. 15/880,107 which was filed on Jan. 25, 2018, which is based on Japanese patent application No. 2017-016414 filed on Feb. 1, 2017, the entire contents of which are incorporated herein by reference.

BACKGROUND OF THE INVENTION

1. Field of the Invention

This invention relates to a rubber hose.

2. Description of the Related Art

A rubber hose suitable for a brake hose is described in JP 2014/219026 A. The rubber hose described in JP 2014/219026 A has a first braided layer formed by braiding yarn material comprising a dry vinylon filament produced by dry spinning method in a three-over, three-under pattern on an outer periphery of an inner rubber layer defining a hollow portion (in which fluid such as a brake fluid is filled). The rubber hose described in JP 2014/219026 A can obtain high vibration durability and low expansion property.

SUMMARY OF THE INVENTION

In recent years, a rubber hose is desired which has high pressure causing inflation or fluid spilling in an outer layer of the rubber hose (an outer rubber layer) when pressuring fluid in the hollow portion of the inner rubber layer (having high sealing trouble occurring pressure) and high pressure to cause bursting the rubber hose (burst pressure).

It is an object of the invention to provide a rubber hose that can unite good vibration resistance, good low expansion property, good flexibility, good sealing trouble occurring pressure property, and good burst pressure property.

According to an embodiment of the invention, a rubber hose comprises:

an inner rubber layer defining a hollow portion;

a first braided layer formed on an outer periphery of the inner rubber layer by braiding a plurality of first multiple wound yarn materials in a three-over, three-under pattern formed by bundling a plurality of first yarn materials comprising a dry vinylon;

a second braided layer formed on an outer periphery of the first braided layer by braiding a plurality of second multiple wound yarn materials formed by bundling a plurality of second yarn materials; and an outer rubber layer formed on an outer periphery of the second braided layer, which adheres to the second braided layer, wherein the young modulus of the first yarn material is not less than 17 GPa and not more than 26 GPa, and a breaking elongation of the first yarn material is not less than 5% and not more than 12%, and wherein an adhesive force between the outer rubber layer and the second braided layer is not less than 10 N/cm and not more than 30 N/cm.

According to the invention, a rubber hose can be provided that can unite good vibration resistance, good low expansion property, good flexibility, good sealing trouble occurring pressure property, and good burst pressure property.

BRIEF DESCRIPTION OF THE DRAWINGS

Next, the present invention will be explained in conjunction with appended drawings, wherein.

DETAILED DESCRIPTION OF THE PREFERRED EMBODIMENTS (Embodiments)

The embodiment in the invention will be described below in conjunction with the appended drawings.

(Rubber Hose 1)

Figure 1:
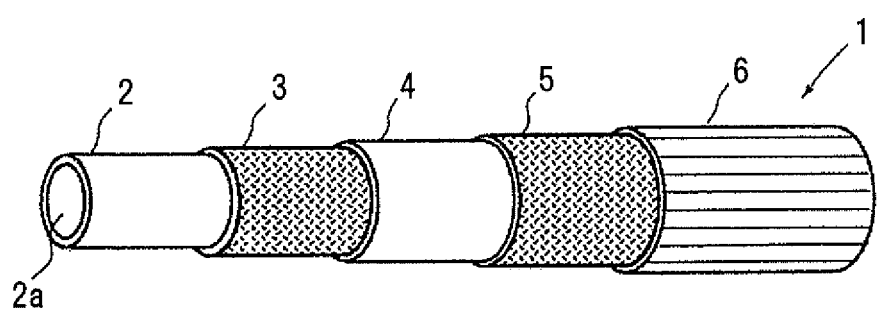
FIG. 1 is a general view schematically showing the rubber hose 1 according to the embodiment of the invention.
Figure 2A:
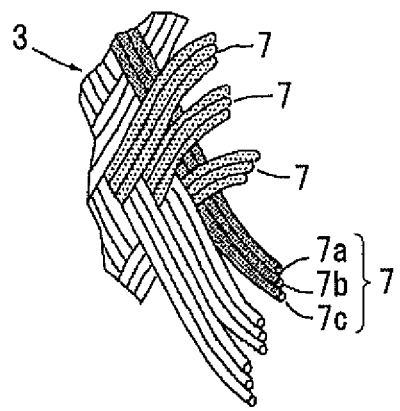
FIG. 2A is a view schematically showing the detail of first braided layer (with a braid formed in a three-over, three-under pattern)
Figure 2B:
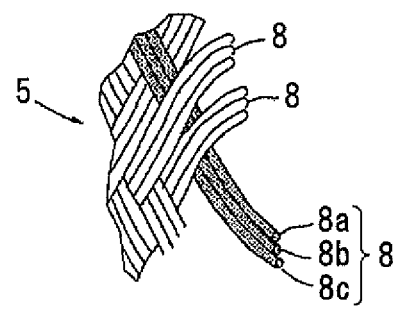
FIG. 2B is a view schematically showing the detail of second braided layer (with a braid formed in a two-over, two-under pattern)
Figure 4:
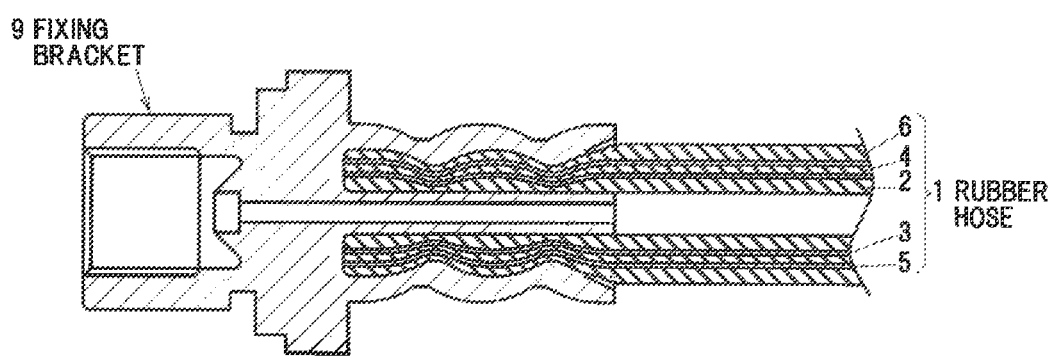
FIG. 4 is a general view schematically showing the rubber hose with the fixing bracket according, to the embodiment of the invention.

FIG. 1 is a general view schematically showing the rubber hose 1 according to the embodiment of the invention. FIG. 2A is a view schematically showing the detail of first braided layer (with a braid formed in a three-over, three-under pattern). FIG. 2B is a view schematically showing the detail of second braided layer (with a braid formed in a two-over, two-under pattern). The rubber hose 1 according to the embodiment is suitable for a brake hose for motorcycle or automobile etc. The rubber hose 1 is provided with an inner rubber layer 2 defining a hollow portion 2A, a first braided layer 3 formed by braiding a plurality of first multiple wound yarn materials 7, a second braided layer 5 formed by braiding a plurality of second multiple wound yarn materials 8 on an outer periphery of the first braided layer 3, and an outer rubber layer 6 formed on an outer periphery of the second braided layer 5, which adheres to the second braided layer 5. The rubber hose 1 is fixed on a connection target such as a brake caliper or a brake pipe (not shown) with a fixing bracket 9, as shown in FIG. 4, swaged and fixed on the outer rubber layer 6. In the embodiment, a middle rubber layer 4 contacting with the first braided layer 3 and the second braided layer 5 is provided between the first braided layer 3 and the second braided layer 5.

(Inner Rubber Layer 2)

The inner rubber layer 2 preferably comprises Ethylene Propylene Diene Monomer (EPDM). Rubbers besides EPDM such as Chloroprene Rubber (CR), Natural Rubber (NR), Styrene Butadiene Rubber (SBR), Isobutylene Isoprene Rubber (HIR), and Chloro Sulfonated polyethylene Monomer (CSM) are used to the inner rubber layer 2 depending on properties. Furthermore, a filler, a cross-link agent, a stiffener, a plasticizer, a cross-link assistant, an activator, an anti-scorching agent, and an oxidation inhibitor may be suitably added to the rubber. A vulcanizing agent, a vulcanizing accelerator, a vulcanizing assistant etc., are applied to a vulcanization system as necessary. Meanwhile, the EPDM has remarkable heat resistance, cool resistance, ozone resistance, and light resistance. The EPDM is remarkably useful as a material for the brake hose since the EPDM is a polymer having low polarity and is unlikely to corrode the fixing bracket.

A hollow portion 2A that is circular in cross section is defined in the inner rubber layer 2 along the longitudinal direction of the rubber hose 1. That is, the inner rubber layer 2 is formed in a cylindrical shape. Fluid such as a brake fluid (it will be referred to as simply "fluid") is filled in the hollow portion 2A.

(First Braided Layer 3)

The first braided layer 3 is formed in a cylindrical shape while contacting with the outer periphery of the inner rubber layer 2. The first braided layer 3 is formed by braiding a plurality of first multiple wound yarn materials 7 in a three-over, three-under pattern. As shown in FIG. 2A, the plurality of first multiple wound yarn materials 7 respectively comprise holding yarns (three holding yarns) bundling three yarn materials 7a to 7c comprising a vinylon (i.e., dry vinylon) produced by a dry spinning method. The dry spinning method is a method to fibrillate spinning liquid by vaporizing vinylon polymer dissolved in volatility spinning liquid by heating while spewing from nozzle. As shown in FIG. 2A, the three-over, three-under pattern is a braided pattern to duck the first multiple wound yarn material 7 under three crossing first multiple wound yarn materials 7 (the three-under) after the first multiple wound yarn material 7 overlaps the three crossing first multiple wound yarn materials 7 (the three-over). Meanwhile, the plurality of first multiple wound yarn materials 7 can comprise two holding yarns, or not less than four holding yarns.

In the embodiment, the young modulus of the first yarn materials 7a to 7c is not less than 17 GPa and not more than 26 GPa. In such configuration, the first yarn materials 7a to 7c can have good vibrate durability, good low expansion property, and good burst pressure property.

When the young modulus of the first yarn materials 7a to 7c is less than 17 GPa, the low expansion property becomes worse and the burst pressure decreases since the inner rubber layer 2 inflates when the fluid filled in the hollow portion 2A is pressured.

"Burst" means a phenomenon to crack the inner rubber layer 2, a middle rubber layer 4 (that will be described below), and the outer rubber layer 6, and spill fluid from the crack when the fluid is pressured. "Burst pressure" means the pressure (applied to the fluid) in the burst. As described above, when the young modulus of the first yarn materials 7a to 7c is less than 17 GPa, loads in the inner rubber layer 2, the middle rubber layer 4, and the outer rubber layer 6 increases since the inner rubber layer 2 inflates when the fluid is pressured. Therefore, it is likely to crack these rubber layers and it causes decreasing the burst pressure.

Meanwhile, when the young modulus of first yarn materials 7a to 7c is more than 26 GPa, the vibration durability becomes worse since yarn elongation decreases and the yarn is likely to fatigue.

In the embodiment, breaking elongation of the first yarn materials 7a to 7e is not less than 5% and not more than 12%. Thus, the first yarn materials 7a to 7e can have good low expansion property and good sealing trouble occurring pressure property.

When the breaking elongation of first yarn materials 7a to 7c is less than 5%, the first yarn materials 7a to 7c is likely to be fractured when a fix clasp is crump to the outer rubber layer 6. Thus, tightening force by swaging between a fix clasp inner pipe formed on the fix clasp, which is inserted into the hollow portion 2A and the inner rubber layer 2 decreases. Therefore, the fluid invades into a space between the fix clasp inner pipe and the inner rubber layer 2, and invades inside the fix clasp. The fluid comes to the second braided layer 5. It is likely to cause inflating the outer rubber layer 6 or spill the fluid (sealing trouble).

When the breaking elongation of first yarn materials 7a to 7c is more than 12%, good low expansion property is not obtained since the inner rubber layer 2 inflates and enlarges when the fluid is pressured.

The first braided layer 3 is formed by braiding the plurality of first multiple wound yarn materials 7 described above under braid density of not less than 3300 dtex/mm and not more than 4200 dtex/mm.

(Middle Rubber Layer 4)

The middle rubber layer 4 is formed on an outer periphery of the first braided layer 3 in the cylindrical shape by contacting with the first braided layer 3. As with the inner rubber layer 2, the middle rubber layer 4 preferably comprises Ethylene Propylene Diene Monomer (EPDM). Rubbers besides EPDM such as Chloroprene Rubber (CR), Natural Rubber (NR), Styrene Butadiene Rubber (SBR), Isobutylene Isoprene Rubber (IIR), and Chloro Sulfonated polyethylene Monomer (CSM) are used to the middle rubber layer 4 depending on properties. Furthermore, the filler, the cross-link agent, the stiffener, the plasticizer, the cross-link assistant, the activator, the anti-scorching agent, and the oxidation inhibitor may be suitably added to the rubber. The vulcanizing agent, the vulcanizing accelerator, the vulcanizing assistant etc., are applied to the vulcanization system as necessary.

(Second Braided Layer 5)

The second braided layer 5 is formed in a cylindrical shape by contacting with an outer periphery of the middle rubber layer 4. The second braided layer 5 is formed by braiding a plurality of second multiple wound yarn materials 8 in a two-over, two-under pattern. As shown in FIG. 2B, the plurality of second multiple wound yarn materials 8 respectively comprise holding yarns (three holding yarns) bundling three yarn materials 8a to 8c comprising dry vinylon. As shown in FIG. 2B, the two-over, two-under pattern is a braided pattern to duck the second multiple wound yarn material 8 under two crossing second multiple wound yarn materials 8 (the two-under) after the second multiple wound yarn material 8 overlaps the two crossing second multiple wound yarn materials 8 (the two-over). Meanwhile, the plurality of second multiple wound yarn materials 8 can comprise two holding yarns, or not less than four holding yarns.

In the embodiment, as with the first yarn materials 7a to 7c, the young modulus of the second yarn materials 8a to 8c is not less than 17 GPa and not more than 26 GPa. The breaking elongation of the second yarn materials 8a to 8c is not less than 5% and not more than 12%.

The second braided layer 5 is formed by braiding the plurality of second multiple wound yarn materials 8 described above under braid density of not less than 3300 dtex/mm and not more than 4200 dtex/mm.

(Outer Rubber Layer 6)

The outer rubber layer 6 is formed on an outer periphery of the second braided layer 5 in the cylindrical shape contacting with the second braided layer 5. As with the inner rubber layer 2 and the middle rubber layer 4, the outer rubber layer 6 preferably comprises Ethylene Propylene Diene Monomer (EPDM). Rubbers besides EPDM such as Chloroprene rubber (CR), Natural Rubber (NR), Styrene Butadiene Rubber (SBR), Isobutylene Isoprene Rubber (IIR), and Chloro Sulfonated polyethylene Monomer (CSM) are used to the outer rubber layer 6 depending on properties. Furthermore, the filler, the cross-link agent, the stiffener, the plasticizer, the cross-link assistant, the activator, the anti-scorching agent, and the oxidation inhibitor may be suitably added to the rubber. The vulcanizing agent, the vulcanizing accelerator, the vulcanizing assistant etc., are applied to the vulcanization system as necessary.

The outer rubber layer 6 adheres to the second braided layer 5. The second braided layer 5 is covered with a Resorcin Formalin Latex agent (that will be referred to as RFL agent) having a Polybutadiene latex (that will be referred to as PB latex). In the embodiment, the outer rubber layer 6 comprises the EPDM. Tetramethylthiuram Disulfide as a Thiuram vulcanizing accelerator, N-oxydietylene-2-benzothiazolylsulfenamide as a Thiazoles vulcanizing accelerator, and m-Phenylenedimaleimide as a vulcanizing assistant having more than two maleimide groups are added to the EPDM.

The outer rubber layer 6 adheres to the second braided layer 5 by vulcanizing after forming the outer rubber layer 6 on the outer periphery of the second braided layer 5. Adhering the outer rubber layer 6 to the second braided layer 5 using such above method has an effect that is possible to increase adhesiveness between the outer rubber layer 6 comprising the EPDM and the second braided layer 5 without using an organic solvent adhesive.

In the embodiment, adhesive force between the outer rubber layer 6 and the second braided layer 5 is not less than 10 N/cm and not more than 30 N/cm. Thus, high hose tensile force and good flexibility can be obtained. Measuring adhesive force is carried out with reference to JIS K 6330-6: 2010.

When the adhesive force between the outer rubber layer 6 and the second braided layer 5 is less than 10 N/cm, it is likely to crack interlaminarly between the second braided layer 5 and the outer rubber layer 6, and leave the rubber hose 1 from the fix clasp when the fix clasp clamps and fixes the outer rubber layer 6 and the rubber hose 1 and the fix clasp are pulled relatively. That is, the high hose tensile force cannot be obtained.

Meanwhile, when the adhesive force between the outer rubber layer 6 and the second braided layer 5 is more than 30 N/cm, the outer rubber layer 6 restrain the movement of the second braided layer 5 too much. Thus, good flexibility cannot be obtained.

The adhesive force between the outer rubber layer 6 and the second braided layer 5 can be changed variously by changing additive amount of the above vulcanizing accelerator and the above vulcanizing assistant, or covering an amount of the RFL agent of the second braided layer 5.

EXAMPLES

Next, Examples and Comparative Examples according to the invention will be described below. Hose main structure and hose performance in Examples 1 to 3, and Comparative Examples 1 to 3 will be described in Table 1.

(Hose Structure)

According to the hose main structure in Table, "First yarn material" means a material configuring the first yarn material, "Pattern" means a braided pattern of the first multiple wound yarn material. For example, "3-3" means the three-over, three-under pattern. "Young modulus" in Table means the young modulus of the first yarn material of which unit is "GPa". "Breaking elongation" means the breaking elongation of the first yarn material of which unit is "%". "Adhesive force" in Table means the adhesive force between the outer rubber layer and the second braided layer of which is "N/cm". "PET" in Comparative Example 2 means polyethylene terephthalate.

Other structures according to the hoses will be described below.

Example 1

Second yarn material: dry vinylon
Braided pattern of second multiple wound yarn material: two-over, two-under
Young modulus of the second yarn material and breaking elongation: as with the first yarn material
Braid density of the first braided layer: 3300 dtex/mm
Braid density of the second braided layer: 3000 dtex/mm Example 2

Second yarn material: dry vinylon
Braided pattern of second multiple wound yarn material: two-over, two-under
Young modulus of the second yarn material and breaking elongation: as with the first yarn material
Braid density of the first braided layer: 3600 dtex/mm
Braid density of the second braided layer: 3300 dtex/mm Example 3

Second yarn material: dry vinylon
Braided pattern of second multiple wound yarn material: two-over, two-under
Young modulus of the second yarn material and breaking elongation: as with the first yarn material
Braid density of the first braided layer: 3900 dtex/mm
Braid density of the second braided layer: 4800 dtex/mm Comparative Example 1

Second yarn material: wet vinylon
Braided pattern of second multiple wound yarn material: two-over, two-under

TABLE 1

| | | Example 1 | Example 2 | Example 3 | Comparative Example 1 | Comparative Example 2 | Comparative Example 3 |
|---|---|---|---|---|---|---|---|
| Hose main structure | First yarn material | Dry vinylon | Dry vinylon | Dry vinylon | Wet vinylon | PET | Dry vinylon |
| | Pattern | 3-3 | 3-3 | 3-3 | 3-3 | 3-3 | 2-2 |
| | Young modulus | 17 | 21 | 25 | 29 | 14 | 21 |
| | Breaking Elongation | 12 | 7 | 5 | 4 | 16 | 7 |
| | Adhesive force | 11 | 20 | 28 | 8 | 32 | 20 |
| Hose performance | Vibration durability | 800 thousand | 800 thousand | 700 thousand | 300 thousand | 700 thousand | 800 thousand |
| | Inflation amount | 0.109 | 0.105 | 0.101 | 0.115 | 0.185 | 0.145 |
| | Flexibility | ○ | ○ | ○ | X | X | ○ |
| | Sealing property | 35 | 40 | 45 | 30 | 35 | 40 |
| | Burst pressure | 100 | 100 | 110 | 100 | 90 | 100 |

Young modulus of the second yarn material and breaking elongation: as with the first yarn material
Braid density of the first braided layer: 4300 dtex/mm
Braid density of the second braided layer: 5100 dtex/mm
"wet vinylon" means vinylon produced by the wet spinning method. The wet spinning method is a method to fibrillate spinning liquid by spewing vinylon polymer dissolved in volatility spinning liquid to the volatility spinning liquid from nozzle.

Comparative Example 2

Second yarn material: PET
Braided pattern of second multiple wound yarn material: two-over, two-under
Young modulus of the second yarn material and breaking elongation: as with the first yarn material
Braid density of the first braided layer: 3000 dtex/mm
Braid density of the second braided layer: 2700 dtex/mm Comparative Example 3

Figure 3:
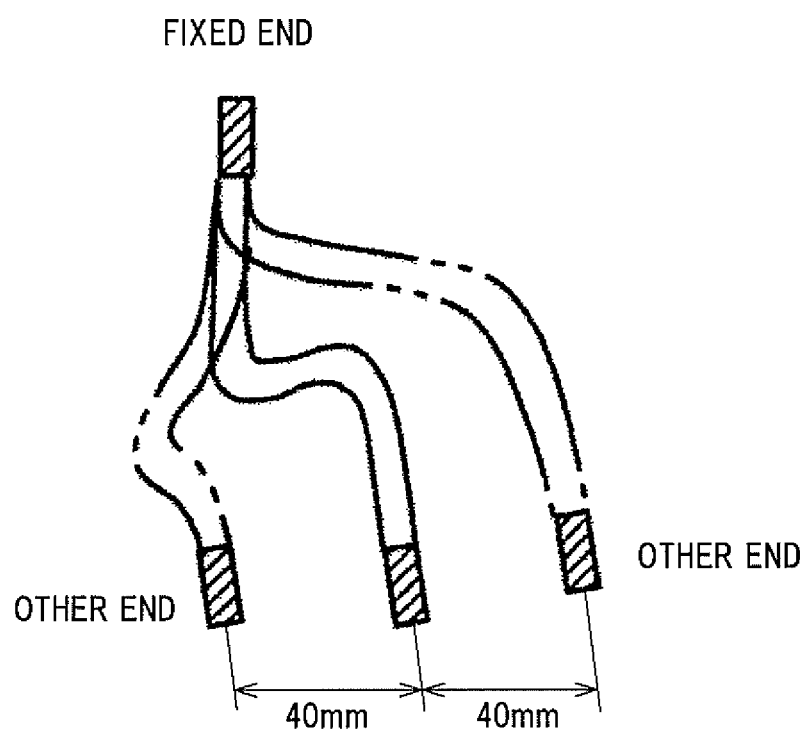
FIG. 3 is a view schematically explaining a bending durability examination of a rubber hose.

Second yarn material: dry vinylon
Braided pattern of second multiple wound yarn material: two-over, two-under
Young modulus of the second yarn material and breaking elongation: as with the first yarn material
Braid density of the first braided layer: 3600 dtex/mm
Braid density of the second braided layer: 3300 dtex/mm
(Hose Performance)
(Vibration Durability)
Vibration durability means resistance to vibration. A vibration durability examination is carried out by using a bending (vibration) examination machine (model number: V270-2) of SUM Electro Mechanics co. ltd. Specifically, rubber hose is attached on a mechanism to repeat pressurizing to 0 MPa and pressurizing to 9.8 MPa to the rubber hose after filling the brake fluid (JIS K2233) in the hollow portion of the rubber hose and atmospheric temperature is regulated at 100° C. Then, as shown in FIG. 3, one end of the rubber hose is fixed and force having bending strokes between ±40 mm at a frequency of 1.66 Hz is added to the other end. A number of bending strokes until the rubber hose has been damaged is defined as a durability number. The damage of the rubber hose means fluid spilling from the rubber hose. Fluid spilling is caused by cracking each rubber layer by fracturing caused by the vibration of the first braided layer. In Examples 1 to 3, each number of durability is not less than 700 thousands and high vibration durability is confirmed.
(Inflation Amount)
In an inflation amount examination, the fluid is filled in the hollow portion of the inner rubber tube and the inflation amount in pressurizing of 10.3 MPa to the hollow portion is calculated. Meanwhile, unit of the inflation amount is cc/305 mm. In Comparative Examples 1 to 3, each inflation amount is more than 0.110 cc/305 mm. In Examples 1 to 3, each inflation amount is not more than 0.110 cc/305 mm. Thus, good low expansion property is confirmed.
(Flexibility)
Flexibility examination is carried out in two items that are bending rigidity and torsion rigidity. When both measured values are less than each threshold, the result of the examination is defined as pass (○). When one of the measure value is more than threshold, the result of the examination is defined as fail (x). According to an bending rigidity examination, load is applied to the orthogonal direction to the longitudinal direction of the hose from between one pair of rollers (pressuring direction of one pair of the rollers to the hose) by contacting outer peripheral surfaces of the one pair of the rollers arranged with a space of 10 mm with two positions in the longitudinal direction of the hose. Then, the load to displace a load point of the hose in a load direction to 20 mm is measured. Total length of the hose is 250 mm. The center position in the longitudinal direction of the hose is adjusted to the center position between one pair of the rollers. The center position is defined as the load point. The threshold in the bending rigidity examination is set at 15 N. According to a torsion rigidity examination, one end of the hose of which the whole length is 226 mm is unrotatably fixed to a jig and the other end is rotated by torque of the motor. Then, the torque in the torsion angle at the other end at 30° is measured. The threshold in the torsion rigidity examination is set at 0.5 Nm. Each of Examples 1 to 3 shows pass (○) in flexibility. Thus, good flexibility is confirmed.
(Sealing Property)
"Sealing property" in Table is a value evaluating the sealing trouble occurring pressure that is a pressure in which the outer rubber layer inflates or causes fluid spilling when the fluid in the hollow portion of the inner rubber layer is pressured. Unit of the sealing trouble occurring pressure is MPa. The sealing examination measures pressure when the trouble (such as inflating the outer rubber layer or fluid spilling) occurs by sealing the brake fluid (JIS K2233) into the hollow portion of the rubber hose (inner rubber hose) after the fix clasp clamps the outer rubber layer, ejecting the hose from a constant temperature bath after heat aging in the constant temperature bath in 120° C. over for 72 hours, pressuring the brake fluid over 3 minutes by increasing pressure by 5 MPa, such as in 20 MPa over 3 minutes, in 25 MPa over 3 minutes, and in 30 MPa over 3 minutes. Each sealing trouble occurring pressure is not less than 35 MPa in Examples 1 to 3. Thus, good sealing trouble occurring pressure property is confirmed.
(Burst Pressure)
A burst pressure examination measures the maximum pressure when the rubber hose bursts by sealing test fluid into the hollow portion of the inner rubber layer, pressuring the test fluid by pressure rising speed of 172.5 MPa/min. Unit of the burst pressure is MPa. Each burst pressure is not less than 100 MPa in Examples 1 to 3. Thus, good burst pressure property is confirmed.
As described in Examples above, according to the invention, the rubber hose can be provided in which can unite good vibration resistance, good low expansion property, good flexibility, good sealing trouble occurring pressure property, and good burst pressure property.

SUMMARY OF THE EMBODIMENTS

Technical ideas understood from the embodiment will be described below citing the reference numerals, etc., used for the embodiment. However, each reference numeral, etc., described below is not intended to limit the constitutional elements in the claims to the members, etc., specifically described in the embodiment.

[1] A rubber hose (1), comprising:
an inner rubber layer (2) defining a hollow portion (2A);
a first braided layer (3) formed on an outer periphery of the inner rubber layer (2) by braiding a plurality of first multiple wound yarn materials (7) formed by bundling a plurality of first yarn materials (7a to 7c) comprising a dry vinylon in a three-over, three-under pattern;

a second braided layer (5) formed on an outer periphery of the first braided layer (3) by braiding a plurality of second multiple wound yarn materials (8) formed by bundling a plurality of second yarn materials (8a to 8c); and an outer rubber layer (6) formed on an outer periphery of the second braided layer (5), which adheres to the second braided layer (5), wherein the young modulus of the first yarn material (7a to 7c) is not less than 17 GPa and not more than 26 GPa, and a breaking elongation of the first yarn material (7a to 7c) is not less than 5% and not more than 12%, and wherein an adhesive force between the outer rubber layer (6) and the second braided layer (5) is not less than 10 N/cm and not more than 30 N/cm.

[2] The rubber hose (1) according to [1], wherein the second yarn material (Sa to Sc) comprises a dry vinylon, and wherein the second braided layer (5) is formed by braiding the plurality of second multiple wound yarn materials (8) in a two-over, two-under pattern.

[3] The rubber hose (1) according to [1] or [2], wherein the first multiple wound yarn material (7) comprises three holding yarns or two holding yarns.

[4] The rubber hose (1) according to any one of [1] to [3], wherein the outer rubber layer (6) comprises ethylene propylene diene rubber.

[5] The rubber hose (1) according to any one of [1] to [4], wherein the second braided layer (5) is covered with a resorcin formalin latex agent including a polybutadiene latex as a latex component.

What is claimed is:

1. A rubber hose with a fixing bracket, comprising:
an inner rubber layer defining a hollow portion;
a first braided layer formed on an outer periphery of the inner rubber layer by braiding a plurality of first multiple wound yarn materials formed by bundling a plurality of first yarn materials;
a second braided layer formed on an outer periphery of the first braided layer by braiding a plurality of second multiple wound yarn materials formed by bundling a plurality of second yarn materials;
an outer rubber layer formed on an outer periphery of the second braided layer, which adheres to the second braided layer, and
the fixing bracket fixed on the outer rubber layer, wherein the first yarn material comprises a dry vinylon and the first braided layer is formed by braiding the plurality of first multiple wound yarn materials in a three-over, three-under pattern, wherein the second yarn material comprises a dry vinylon, and the second braided layer is formed by braiding the plurality of second multiple wound yarn materials in a two-over, two-under pattern, wherein the young modulus of the first yarn material and the second yarn material is not less than 17 GPa and not more than 26 GPa, and a breaking elongation of the first yarn material and the second yarn material is not less than 5% and not more than 12%, and wherein an adhesive force between the outer rubber layer and the second braided layer is not less than 10 N/cm and not more than 30 N/cm.

2. The rubber hose with the fixing bracket, according to claim 1, wherein a number of durability is not less than 700 thousands.

3. The rubber hose with the fixing bracket, according to claim 1, wherein an inflation amount is not more than 0.110 cc/305 mm.

4. The rubber hose with the fixing bracket, according to claim 1, wherein sealing trouble occurring pressure is not less than 35 MPa.

5. The rubber hose with the fixing bracket, according to claim 1, wherein a burst pressure is not less than 100 MPa.

6. The rubber hose with the fixing bracket according to claim 1, wherein the first multiple wound yarn materials comprise three holding yarns or two holding yarns.

7. The rubber hose with the fixing bracket according to claim 1, wherein the outer rubber layer comprises an ethylene propylene diene rubber.

8. The rubber hose with the fixing bracket according to claim 1, wherein the second braided layer is covered with a resorcin formalin latex agent including a polybutadiene latex as a latex component.

9. The rubber hose with the fixing bracket according to claim 1, further comprising:
a middle rubber layer formed between the first braided layer and the second braided layer.

10. The rubber hose with the fixing bracket according to claim 1, wherein the rubber hose comprises a brake hose for a motorcycle or an automobile.

* * * * *